United States Patent [19]

Bartko

[11] 4,393,704
[45] Jul. 19, 1983

[54] GRAIN LOSS SAMPLING DEVICE

[76] Inventor: Richard Bartko, R.R. #1, North Battleford, Saskatchewan, Canada, S9A 2X3

[21] Appl. No.: 259,836

[22] Filed: May 4, 1981

[51] Int. Cl.³ .................... A01D 43/00; A01F 12/00
[52] U.S. Cl. .................... 73/432 R; 56/10.2; 130/27 R; 73/864.51; 73/864.63; 73/863.52; 221/96
[58] Field of Search .......... 73/864.31, 864.51, 864.67, 73/864.63, 432 V, 863.52; 56/10.2, 202, 206, 207; 130/27 R; 221/96, 154

[56] References Cited

U.S. PATENT DOCUMENTS

| 3,475,966 | 11/1969 | Witteman | 73/432 V |
| 3,540,454 | 11/1970 | Giebelstein | 73/432 V |
| 3,593,720 | 7/1971 | Botterill | 130/27 R |
| 3,638,659 | 2/1972 | Dahlquist et al. | 130/27 R |
| 3,939,846 | 2/1976 | Drozhzhin et al. | 130/27 R |
| 4,036,065 | 7/1977 | Strelioff et al. | 73/432 V |
| 4,230,130 | 10/1980 | Staiert | 130/27 R |

FOREIGN PATENT DOCUMENTS

| 2207563 | 8/1973 | Fed. Rep. of Germany | 130/27 R |
| 1270535 | 4/1972 | United Kingdom | 130/27 R |

Primary Examiner—Howard A. Birmiel
Attorney, Agent, or Firm—Stanley G. Ade

[57] ABSTRACT

It is desirable to ascertain the amount of grain passing over the sieves and the like of a combine harvester so that adjustments can be made to reduce this loss to a minimum. Acoustic, electronic and other involved devices are available but these are relatively expensive, and, if faults occur, difficult to replace and/or repair, particularly in the field. The present device is basically mechanical and comprises a hinged frame under the harvesting machine just forwardly of the straw and chaff discharge with a cover plate hinged to it and a drop box detachably held in the frame. When in the closed position it is held by a latch which, when actuated, releases the frame and drops the rear end by gravity onto the ground and holds the cover up so that the drop box slides free of the frame onto the ground. When the straw and chaff discharge passes over the drop box, it collects a sample of grain discharged with the straw and chaff. A spring which holds the cover open as the frame drops, is strong enough to return the frame to the raised position once the weight of the drop box is removed. An indicating flag extends upwardly from the drop box to assist in locating same upon the stubble and straw of the field.

15 Claims, 5 Drawing Figures

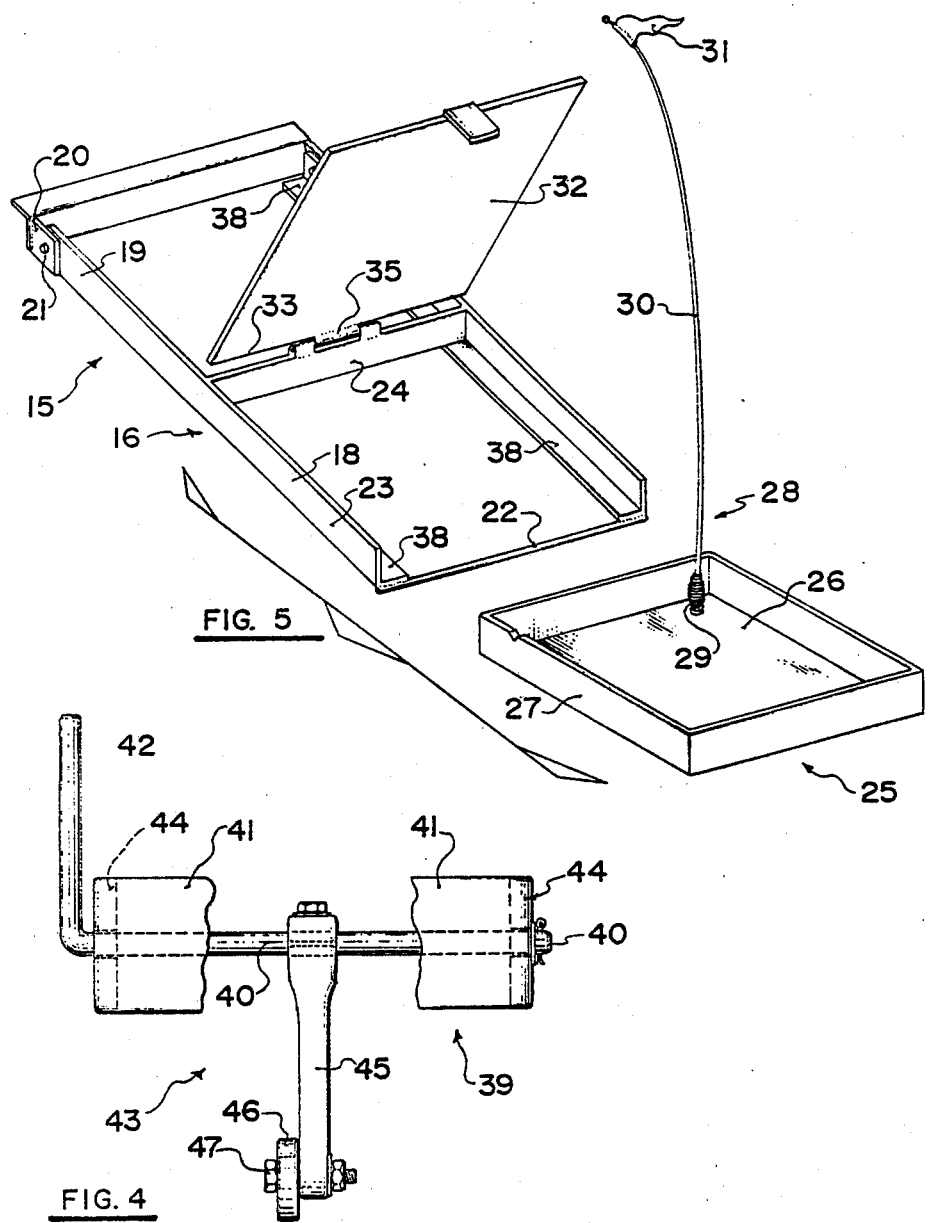

GRAIN LOSS SAMPLING DEVICE

BACKGROUND OF THE INVENTION

This invention relates to new and useful improvements in grain loss sampling devices for grain harvesting machines.

Due to the many adjustments and different operating characteristics of grain harvesting machines, further complicated by the varying crop conditions, it is sometimes difficult to make the necessary adjustments so that adequate threshing takes place yet at the same time preventing loss of grain over the straw walkers, which grain is discharged with the straw and chaff.

Many devices are available to indicate the amount of grain passing over the discharge and these include acoustic devices, electronic sensing device and other relatively involved assemblies all of which are relatively expensive and usually are placed within the discharge path of the straw and chaff. Not only do these interefere with the discharge inasmuch as straw and chaff can be trapped and built up around them, but they are also relatively involved so that if a breakdown occurs during use, they are difficult to repair and/or replace in the field so that operation of the machine either has to continue without the sampling device or, the machine has to be returned for repair and servicing.

SUMMARY OF THE INVENTION

The present device overcomes these disadvantages inasmuch as it is basically mechanical and extremely simple in operation and furthermore does not interfere with the operation of the discharge of the harvesting machine.

In accordance with the invention there is provided a grain loss sampling device for selectively sampling the discharge of a grain harvesting machine, said machine having a straw and chaff discharge across the rear thereof and a supporting framework extending forwardly therefrom; said sampling device comprising in combination a support frame pivotally securable by one end thereof in trailing relationship to said supporting framework of said grain harvesting machine upon the underside thereof and forwardly of said straw and chaff discharge, means to detachably support the other end of said support frame in a nonoperating position and to release said support frame to the operating position, and a drop box detachably held by said support frame, said drop box including sides and a base, said drop box being detachable from said support frame and to the ground therebelow and passing under said discharge when said support frame is in the operating position.

In accordance with another aspect of the invention, there is provided a method of grain loss sampling the discharge of a grain harvesting machine consisting of the steps of detachably holding an open topped drop box upon the underside of the harvesting machine just forwardly of the discharge thereof, selectively dropping the box upon the ground below the harvesting machine while the harvesting machine is operating, driving the machine forwardly over the drop box until the discharge has passed over the box and then evaluating the amount of grain deposited within the drop box from the discharge.

Another advantage of the invention is that the drop box can either be checked immediately it has passed under the discharge of the machine or, alternatively it can be checked when the machine next comes around or at any time desired by the operator of the machine.

A further advantage of the device is that it is extremely simple to replace the drop box within the holding frame and to operate the device so that the drop box is discharged whenever it is necessary to sample the grain loss passing through the discharge of the harvester.

A further advantage of the present invention is to provide a device of the character herewithin described which is simple in construction, economical in manufacture and otherwise well suited to the purpose for which is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 4 is a fragmentary rear elevation of the latch assembly per se.

FIG. 5 is an isometric view substantially similar to FIG. 3.

In the drawings like characters of reference indicate corresponding parts in the different figures.

DETAILED DESCRIPTION

Figure 1:
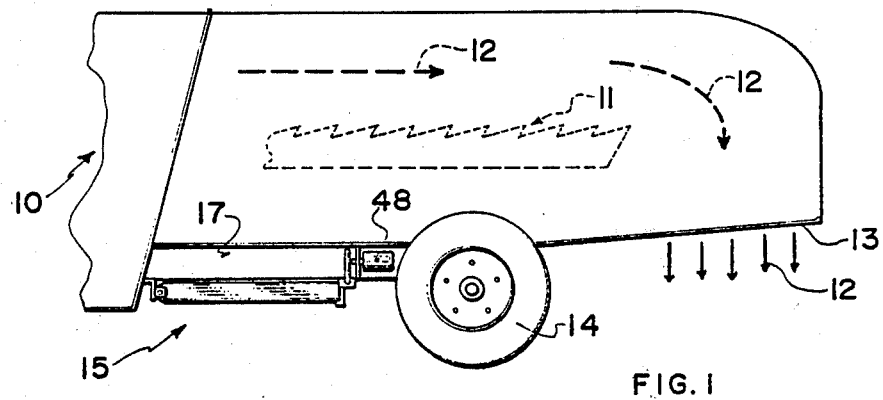
FIG. 1 is a fragmentary schematic side elevation of the rear end of a harvesting machine with the device shown installed thereon.

Proceeding therefore to describe the invention in detail, reference character 10 illustrates in side elevation and schematically, the rear end of a grain harvesting machine such as a combine which includes a straw walker assembly collectively designed 11 and a chaff discharge area thereabove indicated by arrow 12, both the chaff and straw being discharged through the transversely extending rear discharge area 13 which faces downwardly behind the rear wheels 14 of the harvester.

Situated just forwardly of the wheels 14 and of the discharge area 13 is the grain loss sampling device collectively designated 15.

It comprises a support frame collectively designated 16 pivotally secured by the front end thereof to supporting framework 17 of the harvesting machine. In this embodiment, the support frame comprises a pair of spaced and parallel angle members 18 pivoted by the ends 19 thereof to brackets 20 extending from the supporting framework 17, the pivotal securement being indicated by pivots 21.

A cross rod or bar 22 spans the distal or rear ends 23 of the member 18 and a cross member 24 spans the members 18 intermediate the ends thereof and it will be observed that the support frame 16 is pivotally secured to the supporting framework in trailing relationship to the harvester.

A detachable drop box is provided collectively designated 25 and in this embodiment it comprises a rectangular base panel 26 and upstanding surrounding walls 27 which are clearly shown in FIG. 5. It is preferably of steel so that the weight is sufficient to depress the stubble upon which it is discharged and to maintain it in a relatively stable position upon the ground after discharge.

It is provided with an indicating flag assembly collectively designated 28 consisting of a coil spring 29 secured to the base 26 adjacent one corner thereof with a flexible wand 30 extending upwardly from the spring and having an indicating flag 31 secured to the distal end thereof.

A cover or cover panel collectively designated 32 is also provided and consists of a rectangular sheet hinged by the front edge 33 thereof to the aforementioned cross member 24 by means of hinge 35. Tension springs 36 extend from a projecting member 37 on the upper side of the cover panel 32, said springs normally being connected to a point 37 of the supporting framework 17 of the harvesting machine.

Figure 2:
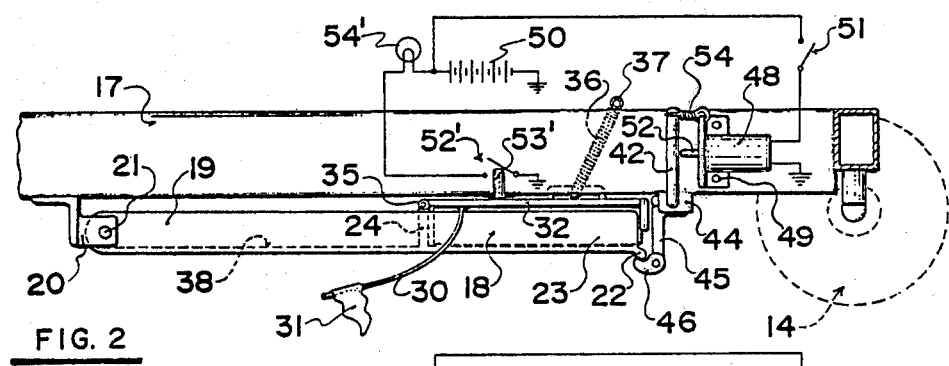
FIG. 2 is a fragmentary enlarged view of the device installed and shown in the non-operating position.

The drop box 25 is normally resting upon the flanges 38 of the rear end portions of the members 18 rearwardly of the cross member 24 and when the support frame 16 is in the uppermost position illustrated in FIG. 2, the cover plate 32 is in the lowermost position upon the members 18 covering the open upper side of the drop box so that chaff or other material cannot inadvertently enter the drop box during the time that it is in this nonoperating position.

Means are provided to detachably retain the assembly in the nonoperating position shown in FIG. 2, said means taking the form of a latch assembly collectively designated 39.

In this embodiment, it consists of a latch rod 40 journalled for rotation within a bracket 41 which in turn is secured to the supporting structure 17 just rearwardly of the end of the support frame 16. The rod 40 is provided with an upturned end 42 at one end thereof and a latch collectively designated 43 secured to the horizontal portion of the rod between the lugs 44 of the bracket 41 within which the rod is journalled for rotation. The latch includes a downwardly extending arm 45 and an adjustable catch portion 46 with nut and bolt assembly 47 clamping the portion 46 in the desired relationship relative to the arm 45 and this latch portion 46 normally engages the cross rod 22 when the assembly is in the uppermost position shown in FIG. 2.

When it is desired to actuate the device and move same to the operating position, the latch assembly is operated. This operation can of course be by means of cable or the like but preferably a solenoid 48 is mounted to the supporting framework 17 by means of bolts 49 and operatively connected to battery 50 with switch 51 being situated remotely at the solenoid and preferably within the operating cab (not illustrated).

When actuated, plunger 52 of the solenoid moves in the direction of arrow 53 against pressure of spring 54 thus disengaging latch 46 from rod 22 so that the support frame 16 together with the drop box 25 drops downwardly towards the ground by gravity so that the rear ends 23 of the support frame 16 engage the ground. Because of the inclination of the support frame 16 assisted by the vibration of same passing over the ground and the weight of the drop box, the drop box slides rearwardly upon the ground or stubble as shown in FIGS. 3 and 5.

Figure 3:
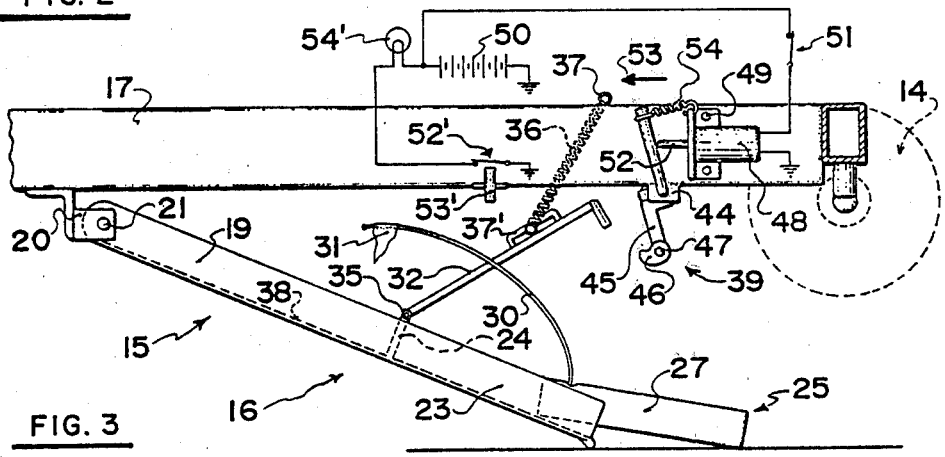
FIG. 3 is a view similar to FIG. 2 but showing the device in the operating position with the drop box being discharged therefrom.

As the support frame 16 has pivoted downardly to the position shown in FIGS. 3 and 5, springs 36 have lifted the cover panel 32 upwardly clear of the drop box thus permitting the drop box to exit from the support frame readily and easily.

The springs 36 are of a sufficient strength so that when the weight of the drop box has been removed from the support frame 16, the springs lift the support frame upwardly thus closing the cover, until latch 46 automatically engages under the rod 22 thus holding the frame in the nonoperating position and clear of the ground with spring 54 returning the latch to the closed or support frame holding position.

The box which has been dropped upon the ground, passes under the discharge 13 of the harvesting machine collecting a sample of material being discharged from the discharge which may then be checked by the operator for grain kernels so that the grain loss can readily be calculated.

The drop box is easily locatable due to the indicating flag assembly 28, the resilience of which forces same upwardly through any straw or chaff which may be covering the drop box. This may be checked immediately or subsequently depending upon the desires of the operator and once it has been checked and emptied, it is easily replaced within the frame for further checking after adjustments have been made to the operating characteristics of the harvesting machine.

The length of the wand 30 is such that it may extend clear of the drop box and cover when in the closed position as indicated in FIG. 2.

It is desirable that the operator receive an indication that the latch assembly has released the support frame 16 and the drop box 25 and in this connection a spring loaded switch assembly 52' may be provided on the support frame 17 with the plunger 53' normally being depressed by the cover panel when the assembly is in the nonoperating position shown in FIG. 2. The switch, when depressed, disconnects lamp 54 from the circuit with battery 50 and as soon as the support frame 16 is released, the plunger 53' extends by spring pressure thus illuminating lamp 54 and indicating that the device has operated.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A grain loss sampling device for selectively sampling the discharge of a grain harvesting machine, said machine having a straw and chaff discharge across the rear thereof and a supporting framework extending forwardly therefrom; said sampling device comprising in combination a support frame pivotally securable by one end thereof in trailing relationship to said supporting framework of said grain harvesting machine upon the underside thereof and forwardly of said straw and chaff discharge, means to detachably support the other end of said support frame in a nonoperating position and to release said support frame to the operating position, and a drop box detachably held by said support frame, said drop box including sides and a base, said drop box being detachable from said support frame on to the ground therebelow and passing under said discharge when said support frame is in the operating position.

2. The invention according to claim 1 in which said means to detachably support the other end of said support frame includes a latch assembly, said latch assembly including a latch bar pivotable to said supporting framework, a latch secured thereto and detachably engaging said support frame when said support frame is in the nonoperating position, and solenoid means to selectively actuate said latch bar and remotely situated means operatively connected to said solenoid means to energize same when desired.

3. The invention according to claim 1 which includes a cover panel pivotally secured to said support frame to detachably cover said drop box when in said support frame and when said support frame is in the nonoperating position.

4. The invention according to claim 2 which includes a cover panel pivotally secured to said support frame to detachably cover said drop box when in said support frame and when said support frame is in the nonoperating position.

5. The invention according to claim 3 in which said cover panel is pivotally secured by one edge thereof to said support frame in trailing relationship thereto and upon the upper side thereof, and spring means extendable between said cover panel and said supporting framework to elevate said cover panel clear of said drop box when said support frame moves to the operating position, said spring means returning said support frame to the nonoperating position when said drop box has discharged from said support frame.

6. The invention according to claim 4 in which said cover panel is pivotally secured by one edge thereof to said support frame in trailing relationship thereto and upon the upper side thereof, and spring means extendable between said cover panel and said supporting framework to elevate said cover panel clear of said drop box when said support frame moves to the operating position, said spring means returning said support frame to the nonoperating position when said drop box has discharged from said support frame.

7. The invention according to claim 1 in which said support frame includes a pair of spaced and parallel drop box retaining members pivotally securable by the front ends thereof to said supporting framework in trailing relationship thereto, and a cross bar spanning the distal ends of said retaining members, said means to detachably support the other end of said support frame detachably engaging said cross bar.

8. The invention according to claim 2 in which said support frame includes a pair of spaced and parallel drop box retaining members pivotally securable by the front ends thereof to said supporting framework in trailing relationship thereto, and a cross bar spanning the distal ends of said retaining members, said means to detachably support the other end of said latch detachably engaging said cross bar.

9. The invention according to claim 3 in which said support frame includes a pair of spaced and parallel drop box retaining members pivotally secured by the front ends thereof to said supporting framework in trailing relationship thereto, a cross bar spanning the distal ends of said retaining member, said means to detachably support the other end of said support frame detachably engaging said cross bar, and a cross member extending between said retaining members intermediate the ends thereof, said cover panel being pivotally secured to said cross member.

10. The invention according to claim 4 in which said support frame includes a pair of spaced and parallel drop box retaining members pivotally secured by the front ends thereof to said supporting framework in trailing relationship thereto, a cross bar spanning the distal ends of said retaining member, said means to detachably support the other end of said support frame detachably engaging said cross bar, and a cross member extending between said retaining members intermediate the ends thereof, said cover panel being pivotally secured to said cross member.

11. The invention according to claims 1, 2 or 3 which includes a flexible indicating assembly secured to said drop box and extending upwardly therefrom, said flexible indicating assembly including a flexible wand secured by the lower end thereof to the base of said drop box and flag means on the upper end of said flexible wand.

12. The invention according to claims 4, 5 or 6 which includes a flexible indicating assembly secured to said drop box and extending upwardly therefrom, said flexible indicating assembly including a flexible wand secured by the lower end thereof to the base of said drop box and flag means on the upper end of said flexible wand.

13. The invention according to claims 7, 8 or 9 which includes a flexible indicating assembly secured to said drop box and extending upwardly therefrom, said flexible indicating assembly including a flexible wand secured by the lower end thereof to the base of said drop box and flag means on the upper end of said flexible wand.

14. The invention according to claim 10 which includes a flexible indicating assembly secured to said drop box and extending upwardly therefrom, said flexible indicating assembly including a flexible wand secured by the lower end thereof to the base of said drop box and flag means on the upper end of said flexible wand.

15. A method of grain loss sampling of the discharge of a grain harvesting machine consisting of the steps of detachably holding an open topped drop box upon the underside of the harvesting machine just forwardly of the discharge thereof, selectively dropping the box upon the ground below the harvesting machine while the harvesting machine is operating, driving the machine forwardly over the drop box until the discharge has passed over the box and then evaluating the amount of grain deposited within the drop box from the discharge and maintaining the drop box covered until same is dropped upon the ground in order to prevent extraneous material from entering the drop box before same is dropped upon the ground.

* * * * *